Feb. 12, 1952  L. J. OWEN  2,585,674
ARTICLE TRANSFER ARRANGEMENT
Filed Jan. 21, 1950
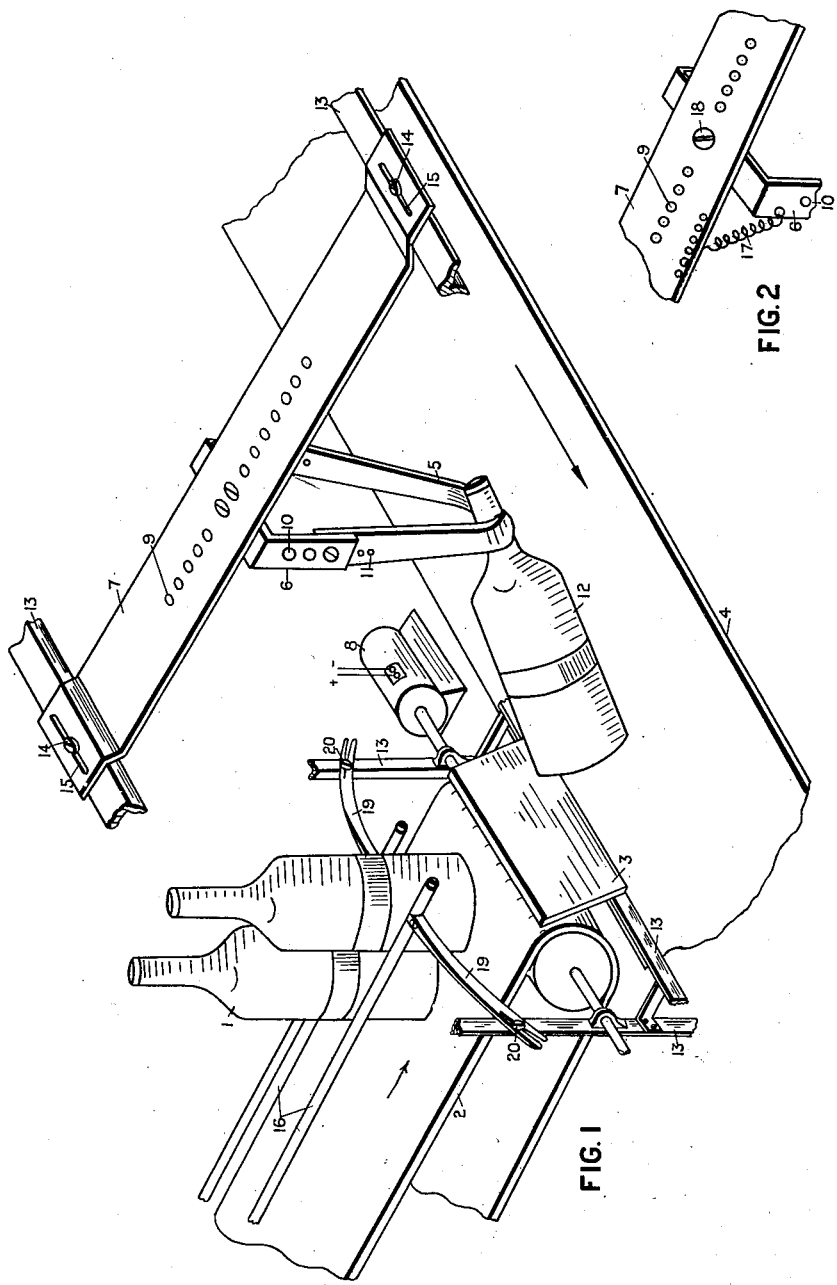
Inventor
Lloyd J. Owen
By Ward, Crosby & Neal
Attorneys Patented Feb. 12, 1952

2,585,674

UNITED STATES PATENT OFFICE 2,585,674

ARTICLE TRANSFER ARRANGEMENT

Lloyd Jones Owen, Concord, near Sydney, New South Wales, Australia, assignor to Communication Engineering Pty. Limited, Cammeray, near Sydney, New South Wales, Australia, a corporation of Australia Application January 21, 1950, Serial No. 139,869
In Australia February 4, 1949

8 Claims. (Cl. 198—33)

This invention relates to arrangements for the controlled transfer of articles from one conveyor to another, and provides means whereby this transfer can be effected so that the articles travel in a predetermined manner on the second conveyor.

Although suitable for use whenever articles have to be transferred from a first to a second conveyor, the invention is particularly adapted for employment in article dispensing systems and the like, where articles of various shapes and sizes, some of them comparatively fragile, have in the course of their transport from a storage to a collecting point to be transferred automatically from conveyor to conveyor.

Such an article dispensing system is, for example, described in U. S. application Serial No. 643,945, filed January 28, 1946, by T. S. Skillman for a Stock Distributing System. In that system the articles to be dispensed are stored according to kind on normally stationary belts, which are selectively movable by push button control from a remote point. On the selection of any storage belt the articles stored thereon are moved forward until the foremost, being separated off from the remainder by the force of gravity, topples from the end of the storage belt onto a continuously moving common conveyor belt, which transports it to a collecting point. The storage belts of said system are arranged in horizontal and vertical rows, and a single common conveyor belt serves each horizontal row, running past the end of each storage belt thereof.

Various difficulties have been found to arise in the operation of said system, at the point where a selected article topples from its storage belt to said common conveyor belt.

Articles of cylindrical or similar shape are, for stability and economy of space, stored in an upright position. When transferred to the common conveyor belt they lie across that belt, and tend to roll in the reverse direction relative to the motion thereof.

In the case of bottles, damage to the necks may be incurred when they topple from an upright position on the storage belt to a lying position on the common conveyor belt. It has been found, too, that bottles are likely to be broken as they are transported along the common conveyor belt if they assume a neck-forward attitude thereon.

Another difficulty arises from the fact that a common conveyor belt may be already carrying articles when it passes a storage belt from which an article is selected. There is a danger that the selected article will fall onto an article already on the conveyor belt, and that one or both will be broken or crushed.

It will be apparent that the abovementioned difficulties, although they have been discussed with particular reference to an article dispensing system, will also arise whenever, as for example in bottling factories, it is desired to transfer articles from one conveyor to another by causing them to topple from an upright position on the first conveyor to a lying position on the second.

According to the invention these disadvantages are overcome by providing an arrangement for controlling the automatic transfer of articles from an upright position on one conveying means to a lying position on a second conveying means.

The arrangement comprises supporting means extending over said second conveying means, and secured thereto a member, preferably of sling-shaped flexible construction, adapted to catch the tops of the articles as they topple and to support them temporarily while their bases move under the influence of said second conveying means. In the preferred embodiment the sling-shaped flexible member is so positioned that the opening thereof is in substantial alignment with the articles carried by said first conveying means, the lowest point thereof lies within the sector described by each toppling article but outside the arc described by the centre of gravity of said toppling article, and the lowest point thereof is at such height above said second conveying means that the base of an article can rest on said second conveying means while its top is still supported by said flexible member.

It is another feature of the invention to make said supporting means adjustable laterally with reference to said first conveying means, whereby the time during which each article is held by said sling-shaped flexible member can be controlled.

According to another feature of the invention said sling-shaped flexible member is adjustable longitudinally with reference to said first conveying means, so that articles of various heights may be handled.

A further feature provides for vertical adjustment of said sling-shaped flexible member to enable articles of various diameters to be handled.

The details of the above and other features of the invention will become apparent from the following description taken with reference to the accompanying drawings, wherein:

Fig. 1 shows, in more or less schematic form, one embodiment of a transfer arrangement according to the invention; while Fig. 2 shows a modification of the invention which is useful in certain circumstances, as will be explained below.

In Fig. 1 the transfer arrangement according to the invention is shown, by way of example, in connection with part of an article dispensing system in which bottles are stored on movable belts. The belts, as explained in the abovementioned U. S. application Serial No. 643,945, can be operated selectively to release these bottles one by one to a common conveyor belt which in turn transports the bottles to a delivery point.

When these bottles topple from the storage belt onto the conveyor belt their fall must be controlled to prevent breakage, and they must be brought into such an attitude that they travel base first to avoid rolling of the bottles on the belt and to protect their necks against breakage. Furthermore, since the conveyor belt is common to a number of storage belts, the position of a bottle on the conveyor belt should vary according to the position along that belt of the storage belt from which it is transferred. A bottle transferred from a storage belt towards the beginning of the conveyor belt should be guided to a position thereon relatively distant from the storage belts, while a bottle from a storage belt towards the end of the conveyor belt should be guided to a position relatively close to the storage belts.

Referring now to Fig. 1 of the drawing in more detail, bottles 1 are carried upright on a movable belt 2, and are guided thereon by adjustable guide members 16. The guide members 16 are supported by brackets 19 adjustably fastened to the framework 13 by the screws 20. The movable belt 2, for example one of the storage belts described in connection with the stock distributing system of U. S. application Serial No. 643,945, can be moved by suitable driving means 8 whenever a bottle carried on this belt is to be transported to a delivery point. When belt 2 is moved forward in the direction of the arrow under the influence of driving means 8, a bottle 1 topples over a slide 3 onto a continuously moving conveyor belt 4. Belt 2 is one of a horizontal row of belts, each discharging articles onto belt 4. The vertical plane in which the neck of the bottle moves as it topples in this way is fixed, within the limits required by the invention, by the guide members 16.

A supporting means in form of a bracket 7 is located above and approximately in line with the centre of belt 2, and is fixed to the framework 13 by screws 14 passing through slots 15 in bracket 7 so that its position is adjustable laterally with reference to the belt 2. A fork 6 is adjustably secured to bracket 7 and carries a sling-shaped flexible member 5 the opening of which is lined up with the bottles 1 as guided by the guide members 16. By means of holes 9, fork 6 may be moved towards or away from the bottles 1, its best distance depending on the height of the bottles 1. Holes 10 and 11, in fork 6 and sling 5 respectively, provide for adjustment of the length of the sling according to the height and diameter of the kind of article being handled, as will be explained below.

The function of sling 5 is to catch the neck of a bottle as it topples from belt 2 and to hold it temporarily while the base of the bottle moves, under the influence of belt 4, in the direction indicated by the arrow on that belt. Bottle 12 is shown with its neck held in this manner by sling 5. The position of sling 5 is so chosen that the centre of gravity of bottle 12 lies between the base of the bottle and sling 5, while the lowest point of sling 5 is positioned at such height above belt 4 and at such distance from belt 2 that the base of bottle 12 rests on belt 4 while its neck is still held by sling 5. Adjustment of fork 6 longitudinally with reference to belt 2, by means of holes 9, and adjustment of the length of sling 5 by means of holes 10 and 11, enable such positions of sling 5 to be chosen for various kinds of articles. If one kind of article only is handled, it is not necessary to make provision for these adjustments.

The movement of belt 4 in the direction of the arrow causes bottle 12 to swing into line with that belt, and further movement of belt 4 withdraws the neck of bottle 12 from sling 5, and the bottle travels base first on belt 4. By altering the position of bracket 7 laterally with reference to belt 2, the time during which the neck of bottle 12 remains in sling 5 can be altered, and since the base of bottle 12 moves across the belt 4 and away from the belt 2 during this time, the position which bottle 12 takes on belt 4 can be influenced. The shorter the time during which the neck of bottle 12 remains in sling 5, the nearer to belt 2 and similar belts discharging onto belt 4 will be the position of the bottle as it moves along belt 4. By a suitable adjustment of the bracket 7 the risk of bottle 12 clashing with an article already on the conveyor belt 4 can be minimised. The best adjustment will depend on whether belt 2 is towards the beginning or end of belt 4, on the type of articles being discharged by other belts onto belt 4, and on the adjustments made to transfer arrangements associated with those other belts.

If the articles being handled have tops of comparatively large diameter, cans for example, the length of the sling 5 can be increased, by means of holes 10 and 11, so that when holding such articles the height of sling 5 above belt 4 is the same as it would be for articles of the same height but with narow tops, bottles for example.

Fig. 2 shows a modification of the invention, wherein the fork 6 is pivoted, at 18, to the bracket 7, so that sling 5 is adapted to turn with an article held thereby. A spring arrangement 17 is provided to return the bracket 7, and with it sling 5, to the normal position after each article has been released from the sling. This arrangement is useful where otherwise the twist of the sling tends to retain the article, or where it is not desired that the sling 5 should be itself flexible.

It will be apparent from the above description that the new arrangement provides means whereby articles of cylindrical or similar shape may be safely transferred from an upright position on one conveyor to a lying position on another, so that they travel in a predetermined manner on the second conveyor. The fall of the articles is broken by the sling, and risk of breakage is thus avoided. The transfer of the articles is controlled so that they take up a base forward attitude on the second conveyor and do not roll thereon nor, in the case of bottles, risk damage to their necks. And the position which the articles assume on the second conveyor is also controlled, so that the risk that an article, on being transferred to the second conveyor, will clash with an article already thereon can be avoided.

Although in the above example the transfer of bottles has been described, the invention is as well applicable to the transfer of other kinds of articles, especially articles of substantially cylindrical shape the height of which is great relative to their diameter.

As mentioned before, the invention is not confined to an article dispensing system, such a system having been mentioned by way of example only, but will be found useful whenever it is desired to transfer articles from one conveyor to another by causing them to topple from an upright position on the first conveyor to a lying position on the second.

The new arrangement can be modified within the scope of the invention according to individual requirements. It is not only useful for the transfer of articles from one conveyor belt to another, but can be used whenever articles stored in an upright position are released for transportation by other conveying means.

I claim:

1. An arrangement for the transfer of articles from a first conveying means on which articles are carried in an upright position to a second conveying means on which they topple to be carried in a lying position, comprising supporting means extending over said second conveying means and a member secured to said supporting means and disposed in the path of said articles moving in the direction of movement of said first conveying means and arranged in a plane extending in the direction of movement of and substantially normal to said second conveying means, said member being adapted to catch the upper portions of said articles as they topple in their original direction of movement from said first conveying means towards said second conveying means and to support them temporarily while the bases thereof are moved by said second conveying means.

2. An arrangement for the transfer of articles from a first conveying means on which said articles are carried in a predetermined direction and in an upright position to a second conveying means upon which they topple in a plane substantiallly parallel to said predetermined direction to be carried in a lying position by said second conveying means, comprising a member having a portion thereof positioned in substantial alignment with said articles carried by said first conveying means and extending transverse to said predetermined direction, said portion being mounted within the sector described by each toppling article and being adapted to engage the upper portion of each toppling article and to support each article temporarily as its base is moved under the influence of said second conveying means.

3. An arrangement for the transfer of articles from a first conveying means on which said articles are carried in an upright position to a second conveying means upon which they topple to be carried in a lying position, comprising supporting means extending over said second conveying means and a sling-shaped flexible member secured to said supporting means, said sling-shaped flexible member being so positioned that the opening thereof is in substantial alignment with the articles carried by said first conveying means and the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means.

4. An arrangement for the transfer of articles from a first conveying means on which said articles are carried in an upright position to a second conveying means upon which they topple to be carried in a lying position, comprising supporting means extending over said second conveying means, a sling-shaped flexible member pivotally secured to said supporting means, and spring loaded means to return said sling-shaped flexible member to its normal position when it is displaced therefrom, said sling-shaped flexible member being so positioned that the opening thereof is in substantial alignment with the articles carried by said first conveying means and the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means.

5. An arrangement for the transfer of articles from a first conveying means on which said articles are carried in an upright position to a second conveying means upon which they topple to be carried in a lying position, comprising supporting means extending over said second conveying means, means to adjust the position of said supporting means laterally with reference to said first conveying means, and a sling-shaped flexible member secured to said supporting means, said sling-shaped flexible member being so positioned that the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means, the time during which the tops of said articles are so supported depending on the adjustment of said supporting means.

6. An arrangement for the transfer of articles from a first conveying means on which said articles are carried in an upright position to a second conveying means upon which they topple to be carried in a lying position, comprising supporting means extending over said second conveying means, a sling-shaped flexible member secured to said supporting means, and means to adjust the position of said sling-shaped flexible member longitudinally with reference to said first conveying means, said sling-shaped flexible member being so positioned that the opening thereof is in substantial alignment with the articles carried by said first conveying means and the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means, said sling-shaped flexible member being positioned by the setting of said adjusting means to suit the height of the kind of article being handled.

7. An arrangement for the transfer of articles from a first conveying means on which said articles are carried in an upright position to a second conveying means upon which they topple to be carried in a lying position, comprising supporting means extending over said second conveying means, a sling-shaped flexible member secured to said supporting means, and means to adjust said sling-shaped flexible member vertically, said sling-shaped flexible member being so positioned that the opening thereof is in substantial alignment with the articles carried by said first conveying means and the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means, variations in the diameter of the tops of the articles handled being compensated for by the vertical adjustment of said sling-shaped flexible member.

8. An arrangement for the transfer of articles from a first conveying means on which said articles are carried in an upright position to a second conveying means upon which they topple to be carried in a lying position, comprising supporting means extending over said second conveying means, means to adjust the position of said supporting means laterally with reference to said first conveying means, a sling-shaped flexible member secured to said supporting means, means to adjust the position of said sling-shaped flexible member longitudinally with reference to said first conveying means, and means to adjust said sling-shaped flexible member vertically, said sling-shaped flexible member being so positioned that the lowest point thereof lies within the sector described by each toppling article but outside the arc described by the centre of gravity of said toppling article, so that the tops of said articles are caught by said sling-shaped flexible member as they topple and are temporarily supported thereby while the bases of said articles move under the influence of said second conveying means.

LLOYD JONES OWEN.

REFERENCES CITED

The following references are of record in the file of this patent:

UNITED STATES PATENTS

| Number | Name | Date |
|---|---|---|
| 1,590,639 | Marsh | June 29, 1926 |
| 1,883,078 | Stretch | Oct. 18, 1932 |
| 2,032,619 | Bounty | Mar. 3, 1936 |